US007933739B2

(12) United States Patent
Brey et al.

(10) Patent No.: US 7,933,739 B2
(45) Date of Patent: Apr. 26, 2011

(54) AUTOMATED ANALYSIS OF DATACENTER LAYOUT USING TEMPERATURE SENSOR POSITIONS

(75) Inventors: Thomas M. Brey, Cary, NC (US); Simon C. Chu, Chapel Hill, NC (US); Richard Edwin Harper, Chapel Hill, NC (US); William Joseph Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 12/047,969

(22) Filed: Mar. 13, 2008

(65) Prior Publication Data
US 2009/0234613 A1    Sep. 17, 2009

(51) Int. Cl.
G06F 15/00   (2006.01)
(52) U.S. Cl. ......... 702/150; 702/130; 702/127; 374/141
(58) Field of Classification Search .................. 700/213, 700/179, 276; 702/150, 45, 127, 194, 130; 374/141
See application file for complete search history.

(56) References Cited

U.S. PATENT DOCUMENTS

| 6,862,179 B2 | 3/2005 | Beitelmal et al. |
| 7,086,603 B2 | 8/2006 | Bash et al. |
| 7,117,129 B1 | 10/2006 | Bash et al. |
| 7,248,942 B2 | 7/2007 | Bash et al. |
| 7,272,945 B2 | 9/2007 | Bash et al. |
| 2005/0286220 A1 | 12/2005 | Moore et al. |

FOREIGN PATENT DOCUMENTS

| JP | 62248020 | 10/1987 |
| JP | 04299720 | 10/1992 |
| JP | 2002319082 | 10/2002 |

*Primary Examiner* — Drew A Dunn
*Assistant Examiner* — Hien X Vo
(74) *Attorney, Agent, or Firm* — Cynthia G. Seal; Jeffrey L. Streets (57) ABSTRACT

Systems, methods, and software for analyzing the layout of computer equipment racks in a datacenter. One embodiment involves obtaining the position relative to the computer room of each of a plurality of temperature sensors distributed among a plurality of computer components mounted between opposing intake and exhaust ends of each computer equipment rack. The layout of the computer equipment racks is automatically determined from the positions of the temperature sensors, and a representation of the layout of the computer equipment racks is electronically stored or displayed. The actual layout is compared to target layout parameters to score the layout.

20 Claims, 6 Drawing Sheets

AUTOMATED ANALYSIS OF DATACENTER LAYOUT USING TEMPERATURE SENSOR POSITIONS

BACKGROUND OF THE INVENTION

1. Field of the Invention

The present invention relates to analysis of the layout of computer systems in a datacenter, and more specifically relates to analysis of the thermal efficiency of the layout.

2. Description of the Related Art

Computer systems consume power and produce heat as a byproduct of power consumption. In particular, computer systems often include many rack-mounted components in a high-density arrangement, which can produce a considerable amount of heat. Thermal management of computer systems requires removing excess heat to control internal temperatures, which may increase the reliability, performance, and longevity of the equipment. In a rack-mounted computer system, for example, rack-mounted blowers are typically used to generate airflow through the rack to remove the excess heat and cool the components. Innovations in computer technology have resulted in increasing component density and power consumption of rack-mounted computer systems, with a corresponding increase in the amount of heat produced. These increases in power consumption and heat production have heightened the emphasis on thermal management of rack-mounted computer systems.

The arrangement of equipment racks in a datacenter can have a dramatic effect on the performance of the cooling system. Racks are commonly arranged in an organized hot-aisle/cold-aisle layout to minimize the likelihood of appreciable volumes of heated exhaust air from directly re-entering the racks. A hot-aisle/cold-aisle layout may include alternating hot aisles and cold aisles, with the front of each rack facing a cold aisle and the rear of each rack directed toward a hot aisle. A computer room air conditioner (CRAC) supplies cool air to the cold aisles. The cool air from the cool aisle is drawn into the front of each rack and the heated air is exhausted through the rear of the rack to the hot aisle. The heated exhaust air then recirculates through the CRAC to be cooled and returned back to the cold aisles.

Even when a hot-aisle/cold-aisle layout is generally adhered to in a datacenter, the specific parameters of that layout affect the optimization of the layout. For example, the spacing of the racks and the dimensions of the resulting hot-aisles and cold-aisles affect how efficiently the space in the datacenter is used and how efficiently the rack-mount components are cooled. Inappropriate implementation of a hot-aisle/cold-aisle arrangement can further reduce cooling performance. For example, datacenter personnel might mistakenly position a first rack with the rear of the rack facing the front of an adjacent second rack, which can cause heated air from the first rack to enter the adjacent second rack.

SUMMARY OF THE INVENTION

One embodiment of the invention provides a method, comprising identifying the position of each of a plurality of temperature sensors distributed among a plurality of computer components mounted between opposing intake and exhaust ends of two or more computer equipment racks, determining the layout of the two or more computer equipment racks from the positions of the temperature sensors, and electronically storing or displaying a representation of the layout of the computer equipment racks.

Another embodiment of the invention provides a computer program product including computer usable program code embodied on a computer usable medium for analyzing the layout of computer equipment racks in a computer room. The computer program product includes computer usable program code for obtaining the position relative to the computer room of each of a plurality of temperature sensors distributed among a plurality of heat-generating computer components removably mounted between opposing intake and exhaust ends of each computer equipment rack, computer usable program code for determining the layout of the computer equipment racks from the positions of the temperature sensors, and computer usable program code for electronically storing or displaying a representation of the layout of the computer equipment racks.

Further details and embodiments of the invention will be described with reference to the following description and the appended claims.

DETAILED DESCRIPTION OF PREFERRED EMBODIMENTS

Embodiments of the invention include software and methods for analyzing a datacenter layout according to the positions of temperature sensors in the rack-mounted components. For example, one embodiment of the invention provides software that automatically determines the layout of multiple equipment racks in the datacenter based on calculations performed on the datacenter-relative coordinates of the temperature sensors. The software can even determine the layout without knowledge of which rack each temperature sensor is positioned in. To do so, the software obtains the datacenter coordinates of intake temperature sensors, which are located throughout the datacenter in or near the front ("intake") ends of the racks. The software analyzes the coordinates of the intake temperature sensors to identify different sets of coplanar intake temperature sensors. The software then analyzes the horizontal spacing between the intake temperature sensors in each set to identify which sets of coplanar intake temperature sensors represent the vertical plane of an intake end (i.e., the "intake plane"), and to eliminate or ignore non-vertical planes and planes that cut across multiple racks. The software then analyzes the spacing of other temperature sensors relative to the intake planes to identify "internal temperature sensors," which are deeper within the rack than the intake temperature sensors. Based on the locations of the internal temperature sensors relative to the intake planes, the software determines the orientation and footprint of each rack. The datacenter coordinates of the sensors may be supplemented by other known or determinable information, such as standard rack dimensions, to assist the software in determining the datacenter layout.

The layout may be analyzed in view of selected criteria to determine its degree of optimization relative to the selected criteria. For example, the software may compare the actual rack spacing and resulting aisle dimensions to predefined target values of these parameters. The software may further identify problems with the layout, such as overlapping hot- and cold-aisles. The software may score the layout based on its degree of optimization. Point penalties may be assessed for deviations from the target values and any detected layout problems. The software may store and/or display a representation of the layout, any detected layout problems, and the layout score on a workstation. This information enables datacenter personnel to improve the configuration of the datacenter. Such improvements may include repositioning racks to correct the datacenter layout. If a particularly egregious problem is detected, the software may further invoke an automated emergency response, such as by powering off or at least reducing the power state of components in the affected racks until corrective action has been taking by personnel.

Figure 1:
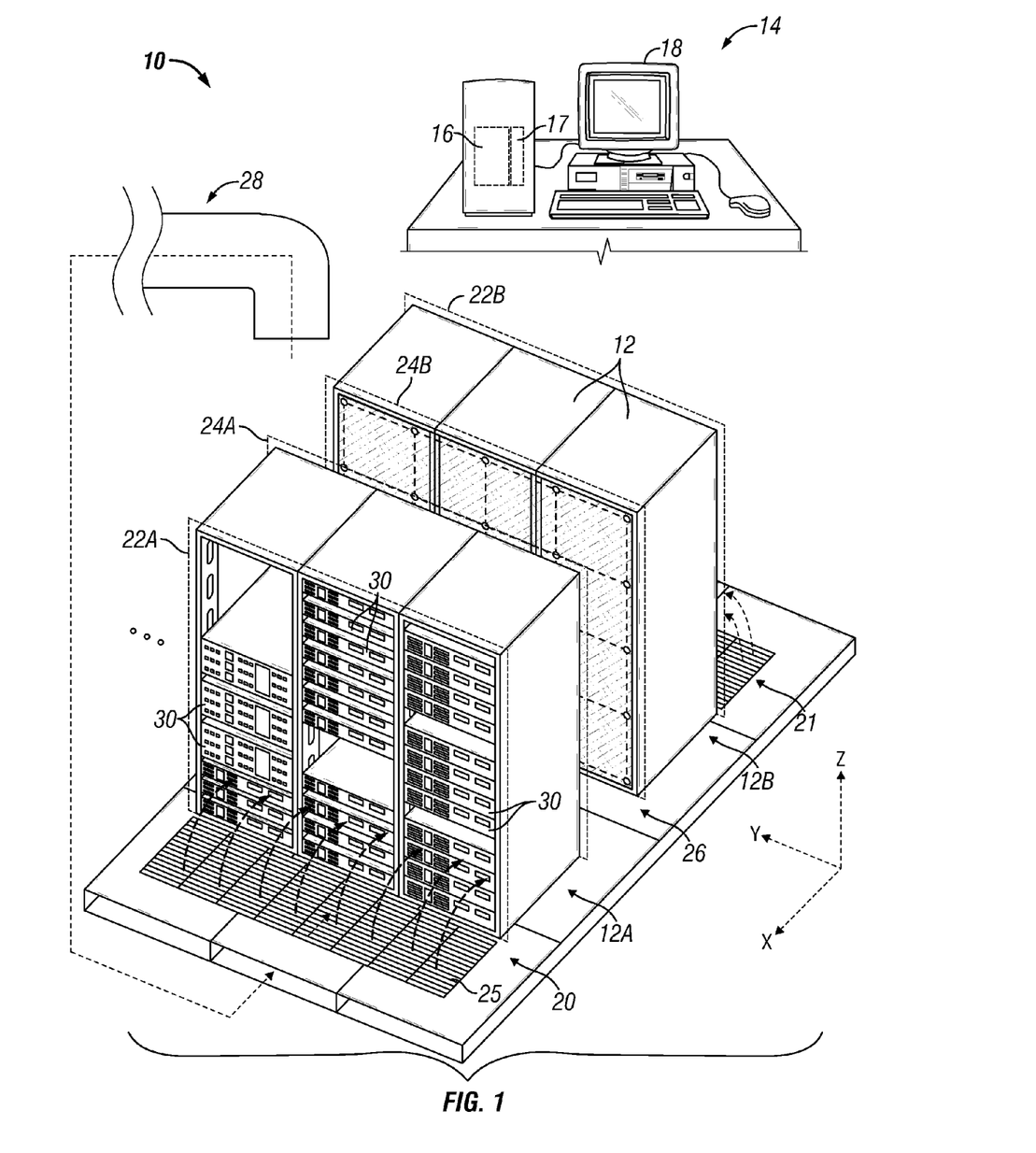
FIG. 1 is a perspective view of an exemplary datacenter in which one or more embodiments of the invention may be implemented.

FIG. 1 is an exemplary view of a datacenter 10 in which one or more embodiments of the invention may be implemented. The datacenter 10 is in a controlled-environment computer room that may have any number of equipment racks. By way of example, two adjacent rows 12A, 12B of racks 12 are shown, spaced apart and positioned "back to back." Each row 12A, 12B may contain any number of racks 12, three of which are shown in FIG. 1. The racks 12 in rows 12A, 12B share a hot aisle 26, with respective cold aisles 20, 21 located opposite the shared hot aisle 26. The generally rectangular front ends of the racks 12 in row 12A, bordering on and facing the cold aisle 20, are referred to as the intake ends 22A. Likewise, the generally planar, rectangular front end of the racks 12 in row 12B, bordering on and facing the cold aisle 21, are referred to as the intake ends 22B. The generally planar, rectangular rear end of the racks 12 in rows 12A, 12B, that border on and face the shared hot aisle 26, are referred to as the exhaust ends 24A, 24B. Numerous electronic components 30 are mounted in the racks 12 of row 12A between the opposing intake and exhaust ends 22A, 24A, and on the racks 12 in row 12B between the opposing intake and exhaust ends 22B, 24B. Typical examples of the components 30 include rack-mount servers, along with supporting hardware such as power modules for supplying power to the servers, and server management modules. A computer room air conditioner ("CRAC") 28 supplies cold air to the cold aisles 20, 21. Blower modules and fans incorporated into the rack-mounted components 30 drive airflow through the racks 12 to cool the components 30. Air from the cold aisle 20 enters the racks 12 in row 12A through the intake ends 22A and is exhausted to the hot aisle 26 through the exhaust ends 24A. Similarly, air from the cold aisle 21 enters the racks 12 in row 12B through the intake ends 22B and is exhausted to the hot aisle 26 through the exhaust ends 24B. The CRAC 28 cools the heated exhaust air from the hot aisle 26 and returns the cooled air to the cold aisles 20, 21.

A computer workstation 14 has an input/output interface including a display 18, and is networked with the components 30. The network provides logical connections between the components 30 and the workstation 14. The components 30 may communicate with the workstation 14 directly over the network, such as using a TCP/IP protocol on an Ethernet network. Some of the components 30 may alternatively interface with connectors on one or more midplanes or backplanes in the rack, and the components 30 may communicate with each other and/or with the workstation 14 over a system bus, such as an RS-485 serial bus. The workstation 14 includes system management software 16 for monitoring and controlling the components 30 and other equipment in the datacenter. In addition to automatically monitoring and controlling the rack system 10, the system management software 16 may also alert the system administrator if and when intervention is required for a particular component 30. The system management software 16 may manage the components 30 in response to or as a function of input from the system administrator and/or as a function of one or more system parameters monitored by the workstation 14. For example, the workstation 14 may selectively monitor and control the power distribution among the components 30, adjust blower speeds and associated airflow rates as needed for properly cooling the rack system 10 and/or its components 30, throttle the components 30, or individually power the components 30 ON or OFF.

Many of the rack-mount components 30 include one or more built-in temperature sensors (not shown in FIG. 1). The components 30 may collectively provide hundreds or more of the temperature sensors at different locations throughout each rack. The temperature sensors are at various depths within the components 30, and may be characterized according to their corresponding depth within the rack (i.e., their "depth classification"). For example, "intake temperature sensors" are provided at or near the front of the rack-mount components. Rack mount components are typically mounted flush with the intake end of a rack. Therefore, intake temperature sensors may generally be assumed to be in close proximity to or flush with the generally planar intake end 22A, 22B of the racks 12 in rows 12A, 12B. Thus, the intake temperature sensors in each rack define the vertical plane of the intake end (i.e. "intake plane) of the rack. "Exhaust temperature sensors" are provided at the rear of the components 30, to detect temperatures of exhaust air. Other, "internal" temperature sensors are positioned at depths between the intake and exhaust temperature sensors. Internal temperature sensors may be located at any depth within a particular component, and are therefore rarely co-planar within a rack or even a single component. Also, due to the various depth dimensions of different rack-mount components (at least in this embodiment), the exhaust temperature sensors in each rack are not assumed to define any particular plane of the racks or rack-mount components, either.

The positions of the temperature sensors may be designated with three-dimensional datacenter-relative coordinates (x,y,z) corresponding to X, Y, and Z axes of the datacenter 10. These positions (x,y,z) of the temperature sensors may be manually or automatically tracked. For example, if a component is moved from a rack 12 in the row 12A to another rack 12 in row 12A or row 12B, the changed coordinates (x,y,z) of the temperature sensors in that component may be manually or electronically updated in the system. The tracked datacenter coordinates and depth classifications of the temperature sensors may be stored in electronic memory, such as in an electronic database 17 included with the management software 16 on the workstation 14 and/or in memory of the components 30. The positions and depth classification of the temperature sensors may be communicated over the network to the workstation 14, in addition to the detected temperatures.

The workstation 14 may determine the layout of the racks 12 in the datacenter from the positions (x,y,z) of the temperature sensors. The positions of the temperature sensors may be supplemented by other information, such as known rack dimensions. The depth of each rack 12 can be assumed, for example, if a standard size rack is used throughout the datacenter and has been entered into the workstation 14. Based on the coordinates (x,y,z) of the sensors and the dimensions of the racks, the software 16 may determine layout parameters such as the footprint, relative spacing, and angle between the individual racks 12 or the rows 12A and 12B of racks. The dimensions of the cold aisles 20, 21 and hot aisle 26 may also be determined. Similarly, the positions of other temperature sensors in other racks in the datacenter may be used to compute further details of the datacenter layout.

Figure 2:
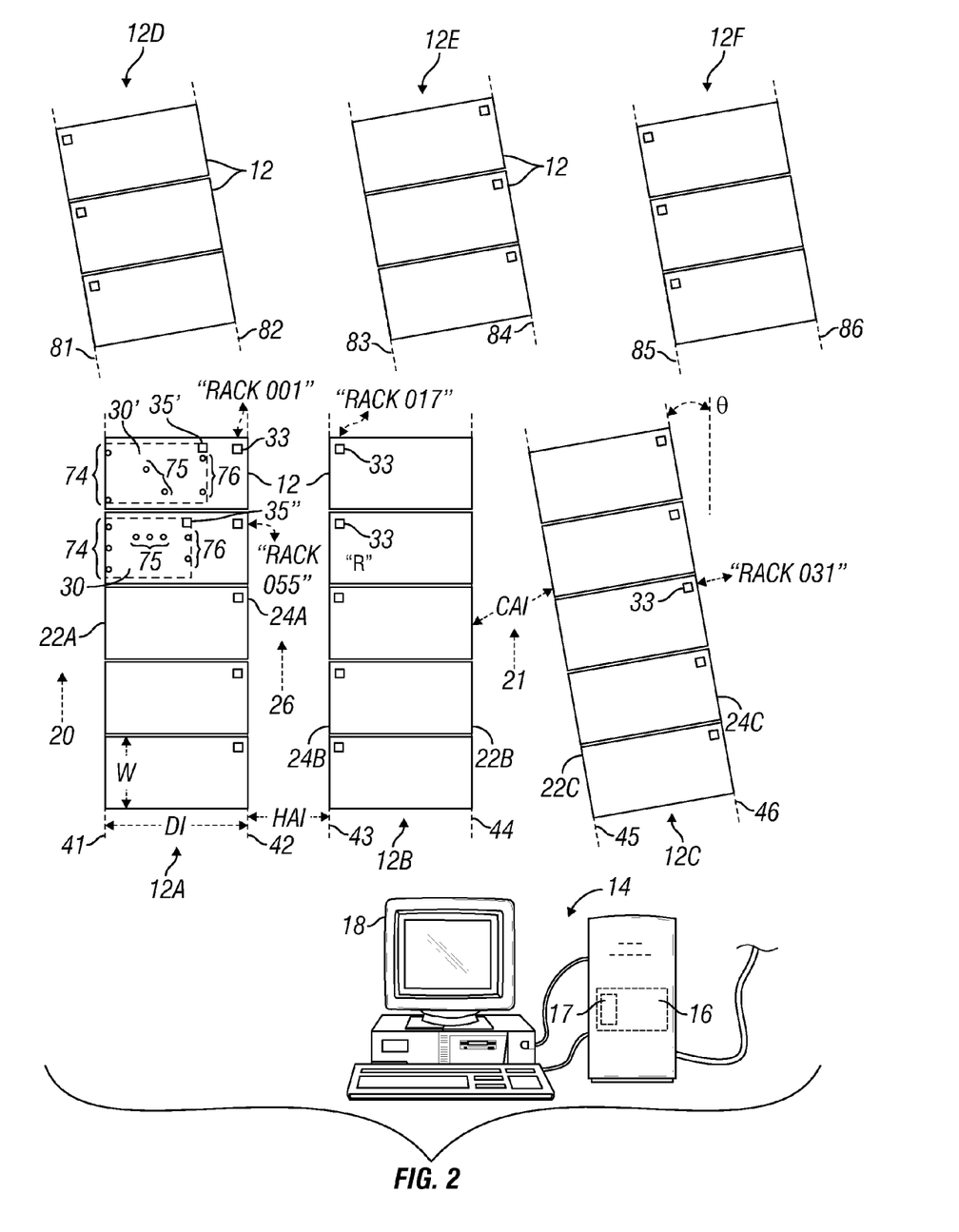
FIG. 2 is a plan view of a section of the datacenter whose layout may be determined according to one embodiment of the invention.

FIG. 2 provides a plan view of a section of the datacenter including the rows 12A and 12B of FIG. 1, a third row 12C spaced across a cold aisle 21 from the row 12B, and three other rows 12D, 12E, and 12F. Two exemplary components 30' and 30" are highlighted for discussion in adjacent racks 12 of row 12A. Each component 30', 30" includes one or more intake temperature sensors 74, internal temperature sensors 75, and exhaust temperature sensors 76. Each rack 12 in the datacenter may be assigned an identifier, such as an alphanumeric "rack ID," to uniquely distinguish each rack 12 from other racks 12 in the datacenter. For example, one of the racks 12 in row 12A is identified in this example with the rack ID "Rack 001," and the adjacent rack 12 in row 12A is identified with the rack ID "Rack 055". Likewise, one of the racks in row 12B is identified with the rack ID "Rack 017," and a rack in row 12C is identified with a rack ID "Rack 031." The rack ID for each rack 12 may be encoded, for example, in a memory location on a rack memory chip 33. The components 30' and 30" may also be uniquely identified, such as with alphanumeric "component IDs" stored in memory locations on component memory chips 35', 35".

In addition to tracking the datacenter-relative positions (x,y,z) of the components, the management software 16 in this embodiment also optionally tracks which rack 12 each component 30 and its built-in temperature sensors are positioned in, such as by manually or automatically associating the component IDs of components in a rack with the rack ID of that rack. In a manual process of tracking which rack 12 each component is in, personnel installing or mounting components on the racks 12 of rows 12A-12F may manually input this information into the workstation 14. For example, when mounting the components 30', 30" on the respective racks 12 of row 12A, the personnel may enter the component IDs of the components 30', 30", along with the component ID of the respective rack 12, into the workstation 14. Whenever a component is moved from one rack to another rack, the personnel may then update this change manually at the workstation 15. The rack on which each temperature sensor 74-76 is located can be inferred from which racks the components 30 are in. Alternatively, the locations of the components 30 in the racks 12 may be automatically tracked. For example, the component memory chips 35', 35" may communicate with the respective rack memory chips 33 to determine that the components 30' and its temperature sensors 74-76 are currently on "Rack 001" and that the component 30" and its temperature sensors 74-76 are currently on "Rack 055".

The cold-aisle boundary for each rack 12 may be determined by determining the intake plane of the rack 12 using non-collinear intake sensors 74 from the rack 12. The orientation of each rack 12 with respect to the intake plane (i.e., which side of the intake plane the rack 12 lies on) may be determined by identifying which side of the intake plane the internal temperature sensors 75 are on. To illustrate with an example, three non-collinear intake temperature sensors 74 from any vertical position (Z-axis) may be selected from the intake end 22A of each rack 12 in row 12A to determine the intake plane 41 that substantially coincides with the intake end 22A of that rack. The intake plane 41 therefore approximates a boundary of the cold aisle 20. The relatively close spacing of the internal temperature sensors 75 to the right of the reference plane 41 indicates that the racks in row 12A are on the right side of the reference plane 41. The exhaust plane 42 defining a boundary of the hot aisle 26 may then be computed using known depth dimension of the racks 12, in the direction of the internal temperature sensors 75. Similar rationale may be applied to the other racks in the datacenter 10 to obtain the exhaust plane 43 coinciding with the exhaust ends 24B of the racks 12 in the row 12B, the intake plane 44 coinciding with the intake ends 22B of the racks 12 in the row 12B, the intake plane 45 coinciding with the intake ends 22C of the racks 12 in the row 12C, and the exhaust plane 46 coinciding with the exhaust ends 24C of the racks 12 in the row 12C. Planes 81, 82, 83, 84, 85, and 86 may be similarly determined for rows 12D-F.

The reference planes (intake and exhaust planes) defining the cold-aisle and hot-aisle boundaries for each rack 12 may be individually determined. The alignment of the racks 12 in the row 12A can be determined mathematically by comparing the individually-determined reference planes for each rack 12. For example, all of the racks 12 in row 12A have the same depth dimension and are aligned, so planes 41, 42 define the cold-aisle boundary and hot-aisle boundary for all of the racks 12 in the row 12A. Furthermore, the software may distinguish row 12A from the row 12D, despite the roughly end-to-end positioning of the rows 12A, 12D, by comparing the reference planes and determining that the intake plane 41 of the row 12A does not coincide with the intake plane 81 of the rack 12D.

Various layout parameters such as rack footprints and aisle dimensions may be computed from the determined reference planes (aisle boundaries) 41-46 and 81-86. For example, the distance D1 between the reference planes 41, 42 (coinciding with the depth dimension of the racks) and the width W of each rack 12 in row 12A determine the footprint of the racks 12 in row 12A. The length of the entire row 12A may be determined, for example, as the horizontal distance between the two furthest-spaced temperature sensors in a given reference plane. For example, W may be calculated as the horizontal distance between the furthest-spaced temperature sensors in intake plane 41, which distance may be computed as the square root of the sum of $(x_1-x_2)^2$ and $(y_1-y_2)^2$.

The dimensions of aisles may be computed from the distance between adjacent racks. For example, the mean width HA1 ("Hot Aisle 1") of the shared hot aisle 26 between the racks 12A, 12B may be determined from the distance between the reference planes 42 and 43. The mean width CA1 ("Cold Aisle 1") of the shared cold aisle 21 between the racks 12B and 12C may be determined from the distance between the reference planes 44, 45. Additional layout parameters, such as an angle θ between the racks 12B, 12C, may also be determined from the computed reference planes 41-46. These additional layout parameters may also be computed by the software 16 at the workstation 14 and electronically displayed in a representative display window 50 on the display 18 of the workstation 14.

In the embodiment discussed with reference to FIG. 2, knowledge of which rack each temperature sensor is in supplements the datacenter coordinates (x,y,z) of each temperature sensor, to assist the software 16 in selecting three or more intake temperature sensors from each rack 12. However, information about which rack 12 each temperature sensor is in may not be available in some instances. For example, personnel often move rack-mount components around in a datacenter. Requiring the personnel to manually enter and update the rack locations of the temperature sensors may subject position tracking to human error. Hardware for automatically determining the rack location of each temperature sensor may not be available in all installations, either. Thus, another embodiment of a method is described with reference to FIGS. 3-6 to automatically determine the layout from the datacenter-relative positions (x,y,z) of the intake temperature sensors, even without knowledge of the which rack each temperature sensor is located in.

Figure 3:
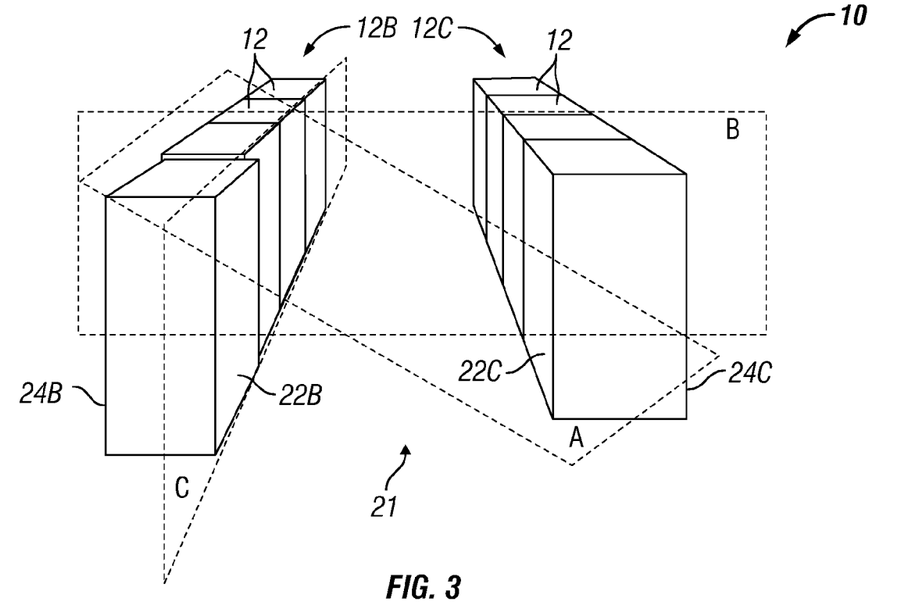
FIG. 3 is a schematic diagram of the adjacent rows illustrating some of the reference planes that may be constructed from different sets of temperature sensors.

FIG. 3 is a schematic diagram of the adjacent rows 12B and 12C illustrating some of the reference planes that may be constructed from selected sets of intake temperature sensors in the datacenter. By way of example, three different planes A, B, and C are constructed from three different sets of non-collinear intake temperature sensors. Planes A and B are constructed from intake temperature sensors from both rows 12B and 12C, and therefore cut across cold aisle 21. Thus, planes A and B do not define an intake plane or exhaust plane of a rack. By contrast, plane C includes only intake temperature sensors from the racks 12 in row 12B. Plane C therefore coincides with the generally vertical plane of the intake end 24A, and can therefore be used to define the intake plane, which is one boundary of the hot aisle 26. The software 16 may implement the following exemplary methodology to determine whether a plane constructed from intake temperature sensors in a datacenter defines an aisle boundary or instead cuts across one or more aisles.

The management software 16 (see FIG. 1) may be used to select sets of intake temperature sensors, construct a plane from the sets of intake temperature sensors, and then test whether each set defines the intake plane of a particular rack or aisle, or instead cuts across an aisle. The management software collects datacenter-relative positional coordinates (x,y,z) of the temperature sensors from the components in which the temperature sensors reside. Each intake temperature sensor is assumed to lie in the intake plane of the intake end of one of the racks. The datacenter-relative coordinates (x,y,z) may be reported directly in terms of datacenter reference axes X, Y, and Z. Alternatively, the management software may first determine the positions of the temperature sensors relative to a local coordinate system within the rack or within a chassis mounted in the rack, and then translate the local coordinates to datacenter-relative coordinates (x,y,z) by applying other knowledge of components and rack positions.

Figure 4:
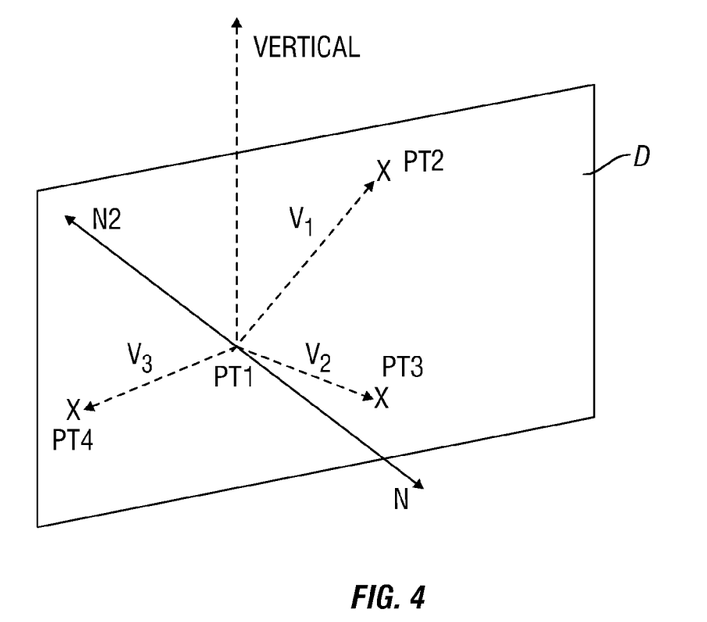
FIG. 4 is a schematic diagram of an exemplary plane D that may be constructed from point locations of three randomly selected intake temperature sensors in the datacenter.

The management software analyzes planes defined by the positions of each set of intake temperature sensors. The software determines which of the constructed planes define aisle boundaries, and eliminates or ignores planes that are not intake planes or exhaust planes. To illustrate by example, FIG. 4 shows an exemplary plane D that may be constructed from point locations PT1, PT2, and PT3 of three randomly selected intake temperature sensors in the datacenter. Because the intake temperature sensors are randomly selected, it is not known which rack each of the points is in. These points may be analyzed to determine whether the plane D cuts across one or more aisles or instead lies in the intake plane of a single rack or row of racks. A vector V1 is computed from PT1 to PT2, and a vector V2 is computed from PT1 to PT3. The length of V1 and V2 are normalized to unity, and the inner product (V1 ■ V2) of V1 and V2 is computed to determine whether V1 and V2 are parallel. A non-zero result of the inner product in this example confirms that V1 and V2 are not parallel, and V1 and V2 may therefore define a plane (a zero result would otherwise have indicated that V1 and V2 were parallel, inconclusive of whether V1 and V2 define a plane). A normal vector N is computed using the cross product (V1× V2) of the vectors V1, V2. If the normal vector N is perpendicular to a vertical vector (i.e., N is parallel to the floor), then the plane D defined by the vectors V1, V2 is assumed to be a vertical plane.

Each remaining sensor in the subset of intake temperature sensors may then be tested to determine whether it lies in the plane D defined by PT1-PT3. For example, to test if PT4 lies in plane D, a vector V3 from PT1 to PT4 is computed. The length of V3 is normalized to unity, and a normal vector N2 is computed using the cross product of V1 and V3 (i.e., V1×V3). Next, the inner product of V3 and N (i.e., V3 ■ N) is computed, and a non-zero result confirms that V3 and N are not parallel. The inner product of N and N2 (i.e., N ■ N2) is also computed, and a zero result confirms that the N and N2 are parallel. Thus, PT4 lies in the plane D. This process of testing for sensors that lie in plane D may be repeated for the remaining sensors in the subset.

The software may next determine whether plane D cuts across an aisle by analyzing the spacing between points in plane D. For example, the software may examine the horizontal spacing between consecutive points in Plane D to determine whether the spacing of the sensors are consistent with the expected spacing of temperature sensors in the intake end of the rack, or whether the spacing is large enough to indicate the two sensors are likely to be from different racks spaced across one or more aisles from each other. The software may identify two consecutive intake temperature sensors in the plane D by selecting a first intake temperature sensor from the plane D and identifying a second sensor from the plane D having the smallest horizontal distance from the first temperature sensor. The distance between these consecutive sensors should be larger than zero, however, because sensors that are at different heights in a common rack may have zero horizontal offset and cannot be used to differentiate between the plane of a rack and planes that cut across multiple racks. Thus, a lower threshold value HMIN may be set, wherein sensors with a horizontal spacing of less than HMIN are ignored. The distance between the two consecutive sensors may also be compared to an upper threshold value HMAX, to determine whether the two sensors span multiple racks or come from the same rack. The value of HMAX is selected to be small enough not to span across the narrowest desired aisle but large enough to include the likely range of horizontal spacing between consecutive sensors lying within the same aisle boundary. Typically HMIN values of up to 5 inches and HMAX values of around 30 inches work well, although these values may be customized for specific applications.

Figure 5:
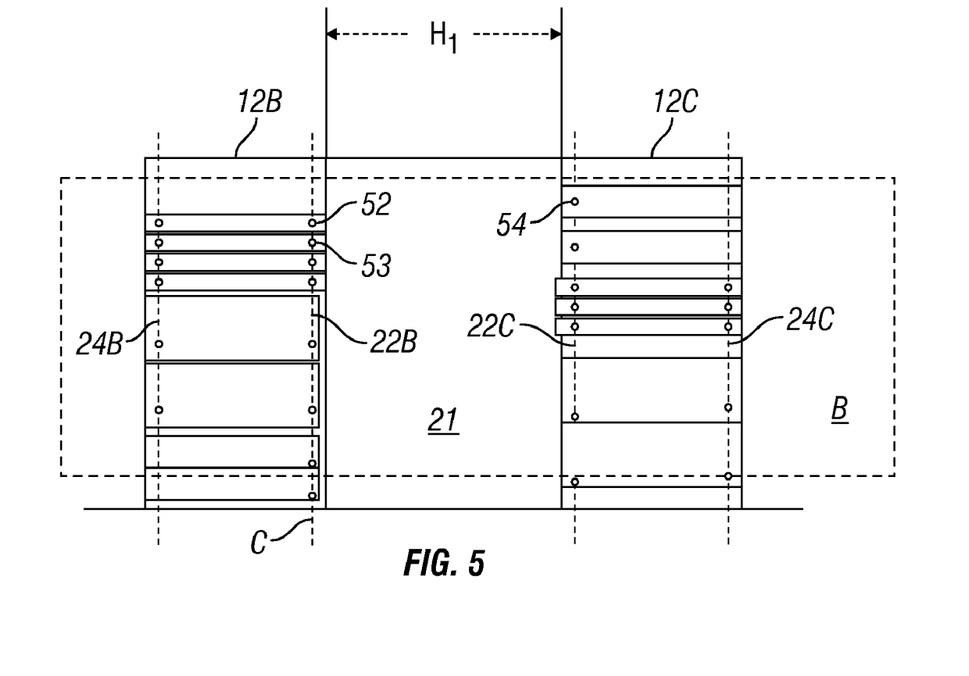
FIG. 5 is a side elevation view of the two racks illustrating a Plane B that cuts across a cold aisle.

FIG. 5 is a side elevation view of the two racks 12B, 12C illustrating plane B (see FIG. 3) aligned with the plane of the page. Plane B includes intake temperature sensors from both racks 12B, 12C, such that plane B cuts across the cold aisle 21. Intake temperature sensors 52, 53 are at different heights within the same rack 12B and have a zero horizontal spacing (less than HMIN), so the pair of intake temperature sensors 52, 53 cannot be used to test whether Plane B is an aisle boundary or cuts across an aisle. Another set of intake temperature sensors 52, 54 from plane B have a spacing H1 that is larger than HMAX, from which the software can determine that plane B cuts across an aisle. Thus, plane B is determined not to be an intake plane, and is ignore. This analysis may be repeated with other planes constructed from different sets of points, to identify planes that define intake planes of the racks.

Figure 6:
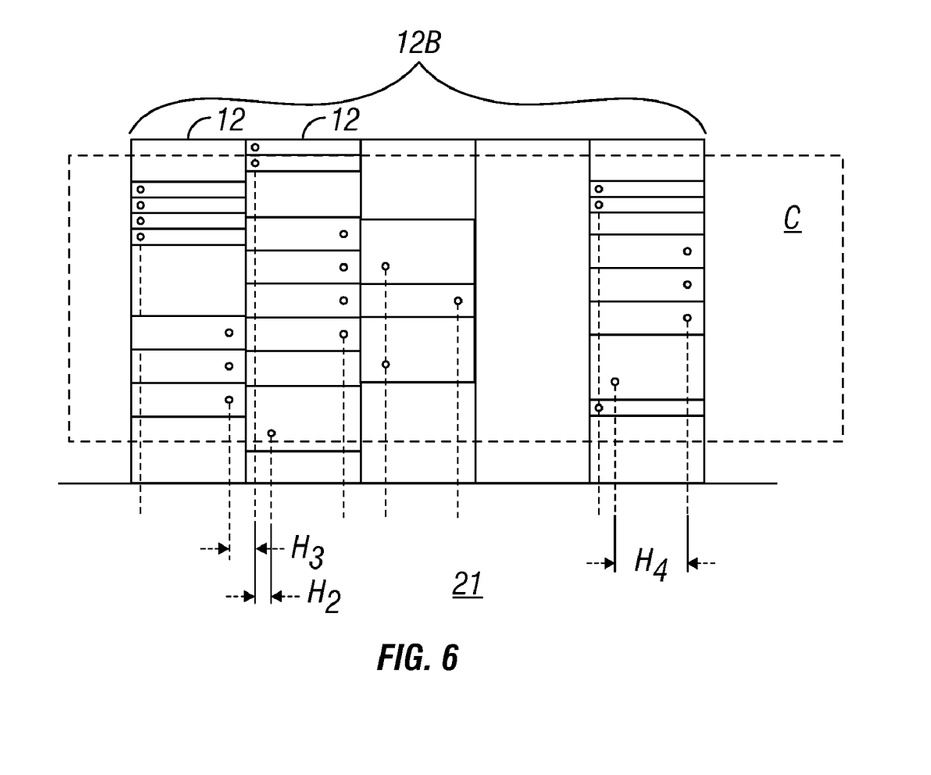
FIG. 6 is a front elevation view of one row of racks, with the intake plane C aligned with the plane of the page.

FIG. 6 is a front elevation view of the rack 12B, with plane C aligned with the plane of the page. Plane C includes only intake temperature sensors from the intake ends of the racks 12 in row 12B, and therefore approximates the generally vertical intake end 22B of the rack 12B bordering on the hot aisle 26. The horizontal spacing between selected pairs of consecutive intake temperature sensors in plane C are labeled by way of example as H2, H3, and H4. The software may analyze the positions of all the temperature sensors in Plane C to determine that even the largest spacing between consecutive temperature sensors (the distance H4 in this example) is less than HMAX. Thus, the software may identify plane C as an aisle boundary bordering on the hot aisle 26 for the rack 12B. Other planes may be similarly constructed and tested to determine other aisle boundaries in the datacenter. Then, the aisle boundaries may be used to compute layout parameters such as aisle dimensions and rack footprints. The identified aisle boundaries may be supplemented with additional information, such as known/standard rack dimensions, to further compute or verify layout parameters.

The system designer for racks and rack components may specify target values for selected layout parameters to guide the datacenter personnel in arranging the racks in the datacenter. However, because datacenter personnel are not infallible, the datacenter personnel may not always arrange the datacenter exactly as prescribed by the system designer. Thus, the management software computes the actual layout of the datacenter from the positions of temperature sensors, as described above, and then analyzes the layout by comparing the actual values of these layout parameters to their target values. The management software may score the layout according to how the actual values compare to the target values. The management software may also verify that a hot-aisle/cold-aisle layout is being followed by ensuring that the exhaust end of a first equipment rack faces the exhaust end of an adjacent second equipment rack, thereby defining a hot aisle between the two racks, or that the intake end of the first equipment rack faces the intake end of the second equipment rack, thereby defining a cold aisle between the racks. The software may assign larger point penalties or initiate evasive action if the intake end of the first equipment rack faces the exhaust end of the second equipment rack, indicating a departure from a hot-aisle/cold-aisle layout for the first and second rack. In addition to evaluating the spacing between racks or rows spaced across an aisle, the software may also evaluate the spacing of the racks from the walls of the datacenter. For example, the software may also identify a rack having an intake end or an exhaust end facing a wall of the computer room and assess a point penalty if the spacing between the identified rack and the wall is less than a predefined threshold from the wall. These are just examples of the various layout parameters that may be evaluated. One skilled in the art may appreciate other layout parameters to be evaluated, which may vary according to the policy parameters of a given datacenter.

Figure 7:
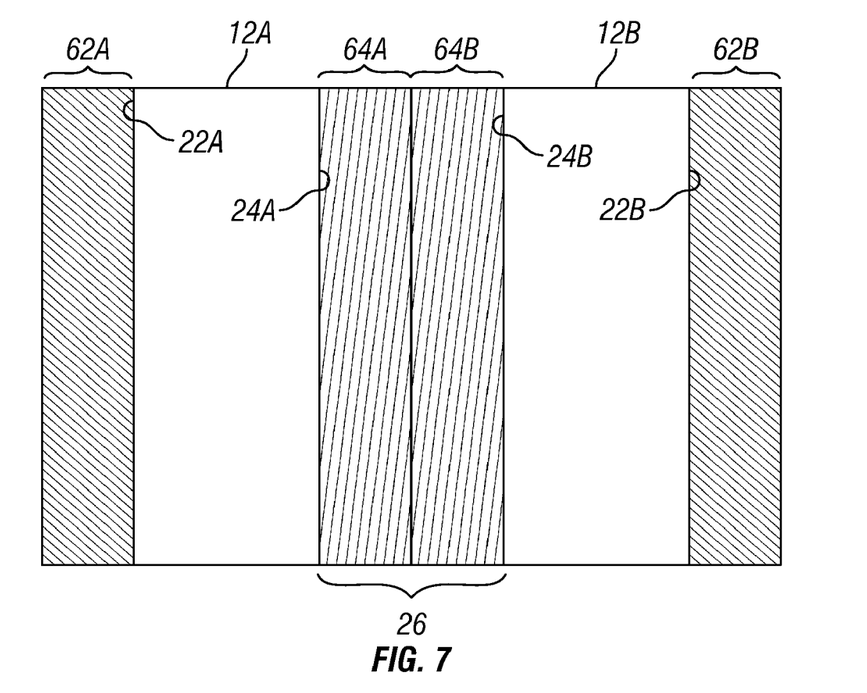
FIG. 7 is a plan view of a positioning of the racks for which no point penalties are assessed.

FIG. 7 illustrates a positioning of the racks 12A, 12B for which no point penalties are assessed. A target "cold aisle space" 62A represents the desired space adjacent to the intake end 22A of the rack 12A. The system designer may select a target value for the dimensions of the target cold aisle space 62A to provide sufficient room for air to enter the rack 12A, without allocating more of the limited datacenter floorspace than necessary for proper cooling of the rack 12A. A target "hot aisle space" 64A represents the desired space adjacent to the exhaust end 24A of the rack 12A. The system designer may select the dimensions of the target hot aisle space 64A to provide sufficient room for exhaust air to exit the rack 12A, without allocating more of the limited datacenter floorspace than necessary for proper cooling of the rack 12A. A target cold aisle space 62B and target hot aisle space 64B may similarly be selected for the rack 12B. In this example, each rack is assumed to be identical, and the system designer has selected cool zones 62A, 62B of equal size and target hot aisle spaces 64A, 64B of equal size. In this ideal positioning, the target hot aisle spaces 64A, 64B are just touching, without any overlap or gap between them, which allocates for each rack 12A, 12B just the amount of floorspace allocated by the system designer for exhaust air to exit. The resulting width of the hot aisle 26 is equal to the combined widths of the target hot aisle spaces 64A, 64B. Because the racks 12A, 12B are ideally positioned, no point penalty will be assessed for this portion of the layout.

Figure 8:
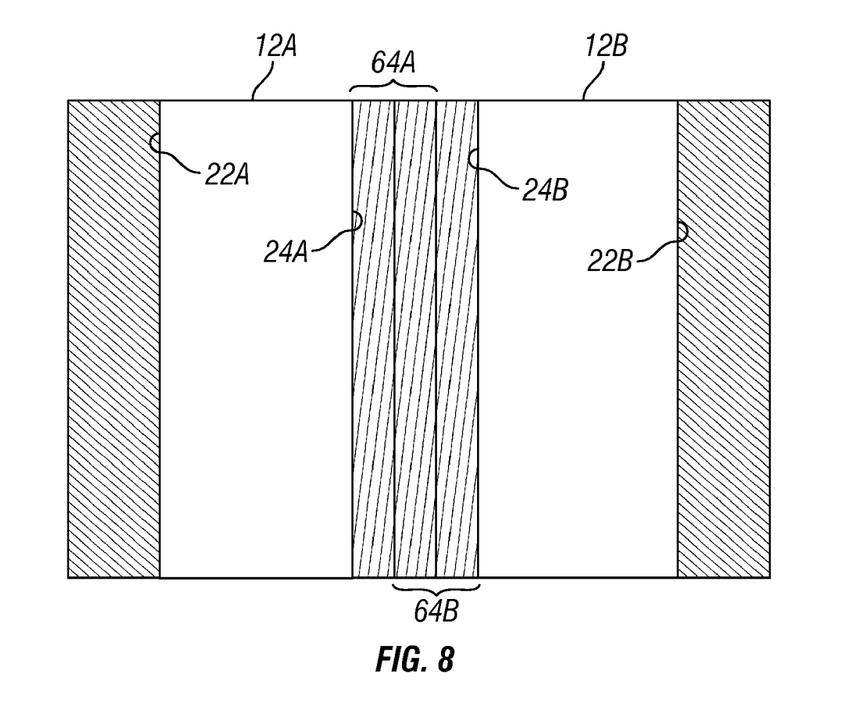
FIG. 8 is a plan view of the racks positioned too closely, resulting in overlapping target hot aisle spaces.

FIG. 8 is a plan view of the racks 12A, 12B positioned too closely, resulting in overlapping target hot aisle spaces 64A and 64B. The overlap may reduce how easily heated exhaust air is removed from the racks 12A, 12B, because less floorspace has been allocated than the combined target hot aisle spaces 64A, 64B specified by the system designer. A scoring penalty may therefore be assessed for this anomaly to account for this deviation from the ideal positioning of racks 12A, 12B. For example, a certain number of points may be deducted from a maximum score of, e.g., 100 points. The amount of the point deduction may also reflect the amount of overlap, such as in proportion to the amount of overlap. Furthermore, a report may be provided to explain the nature of each identified anomaly and its point value, so that datacenter personnel may address the anomalies. The point values attributed to an anomaly may be used to prioritize which anomalies need the greatest attention.

Figure 9:
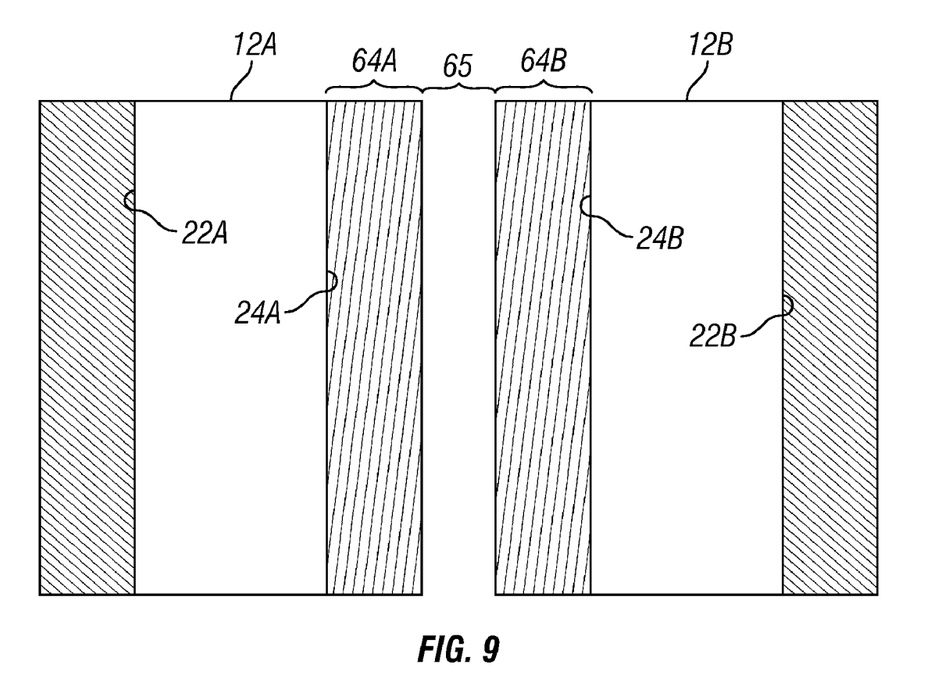
FIG. 9 is a plan view of the racks positioned too far apart, resulting in an unnecessarily large hot aisle.

FIG. 9 is a plan view of the racks 12A, 12B positioned too far apart, resulting in an unnecessarily large hot aisle 26. Thus, there is a gap 65 between the two target hot aisle spaces 64A, 64B, reflecting the fact that more floorspace has been used for the hot aisle 26 than the combined target hot aisle spaces 64A, 64B. A point penalty may be assessed for this anomaly because datacenter floorspace is limited and less floorspace may be available to other aisles as a result.

Figure 10:
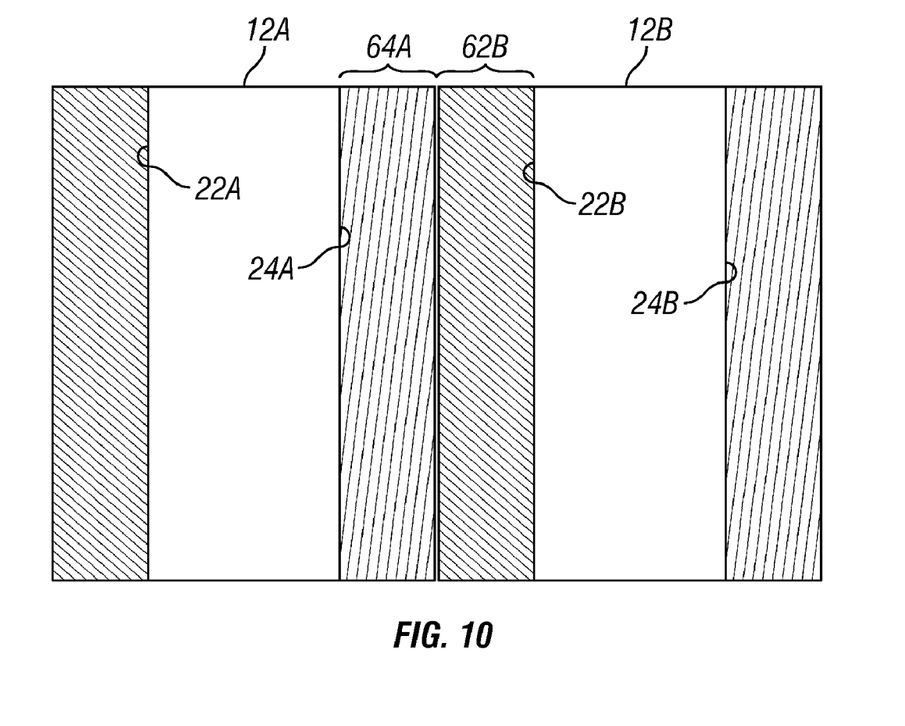
FIG. 10 is a plan view of the racks illustrating a layout anomaly, whereby the exhaust end of one rack is directly facing the intake end of the adjacent rack

FIG. 10 is a plan view of the racks 12A, 12B illustrating a particularly egregious layout anomaly, whereby the exhaust end 24A of the rack 12A is directly facing the intake end 22B of the rack 12B. Thus heated exhaust air from the rack 12A may directly enter the rack 12B through the intake end 22B. Though the spacing between the racks 12A, 12B would otherwise be proper, the cooling performance of the rack 12B will be seriously diminished by this anomaly. An especially large point penalty may be assessed for this anomaly. Furthermore, because of the severity of this anomaly, the system may be configured to automatically shut down or at least reduce power to the components on the rack 12B. An alert may be sent to datacenter personnel to reposition the racks 12A, 12B.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include any of the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention may be described above with reference to, for example, flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, or functions/acts described with reference to system or apparatus figures, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks, or functions/acts described with reference to system or apparatus figures. For example, the workstation 14 and/or the rack-mount servers or other rack-mount components 30 in the above figures may read, store, and/or execute all or portions of the computer-usable code.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart, block diagram blocks, or with respect to the apparatus or systems shown. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart, specified in the block diagram blocks, and/or specified with reference to the system or apparatus shown in the figures.

Any flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   identifying the position of each of a plurality of temperature sensors distributed among a plurality of computer components mounted between opposing intake and exhaust ends of two or more computer equipment racks;
   determining the layout of the two or more computer equipment racks from the positions of the temperature sensors; and
   electronically storing or displaying a representation of the layout of the computer equipment racks.

2. The method of claim 1, wherein the step of determining the layout comprises identifying, for each computer equipment rack, three or more intake temperature sensors defining a plane of the intake end.

3. The method of claim 2, further comprising:
   randomly selecting a subset of the intake temperature sensors;
   determining from the positions of the subset of intake temperature sensors whether the subset of intake temperature sensors define a vertically oriented plane; and
   if the plane is determined to be vertically oriented, comparing the horizontal spacing between consecutive temperature sensors in the plane to the expected maximum spacing between temperature sensors in the intake end of a rack to determine whether the plane traverses any aisle between racks.

4. The method of claim 3, further comprising identifying the plane as a cold-aisle boundary if the plane does not traverse any aisle between racks.

5. The method of claim 1, further comprising identifying if the intake end of a first computer equipment rack faces the exhaust end of a second computer equipment rack, and generating an alert in response.

6. The method of claim 1, wherein the step of determining the layout of the computer equipment racks includes determining the footprint of each computer equipment rack.

7. The method of claim 1, wherein the step of determining the layout of the computer equipment racks includes determining the spacing between the computer equipment racks.

8. The method of claim 1, further comprising:
   selecting a target cold aisle space for each computer equipment rack;
   identifying a pair of adjacent racks having a shared cold aisle; and
   identifying and assessing a point penalty if the target cold aisle spaces overlap or have an intervening gap.

9. The method of claim 1, further comprising:
   selectively repositioning one or more of the rack-mount computer components with respect to the computer equipment racks; and
   repeating the step of obtaining the positions of the temperature sensors after repositioning the rack-mount computer components.

10. The method of claim 1, further comprising:
    comparing actual values of layout parameters to target values of the layout parameters; and
    scoring the layout according to the comparison between the actual values and target values of the layout parameters.

11. A computer program product including computer usable program code embodied on a non-transitory computer usable storage medium for analyzing the layout of computer equipment racks in a computer room, the computer program product including:
    computer usable program code for obtaining the position relative to the computer room of each of a plurality of temperature sensors distributed among a plurality of heat-generating computer components removably mounted between opposing intake and exhaust ends of each computer equipment rack;
    computer usable program code for determining the layout of the computer equipment racks from the positions of the temperature sensors; and
    computer usable program code for electronically storing or displaying a representation of the layout of the computer equipment racks.

12. The computer program product of claim 11, wherein the computer usable program code for computing the layout comprises computer usable program code for identifying for each computer equipment rack a plurality of temperature sensors defining a plane of the intake end.

13. The computer program product of claim 12, further comprising:
    computer usable program code for randomly selecting a subset of the intake temperature sensors without regard to which rack each intake temperature sensor is positioned in;
    computer usable program code for determining from the positions of the subset of intake temperature sensors whether the subset of intake temperature sensors define a vertically oriented plane; and
    computer usable program code for comparing the horizontal spacing between consecutive temperature sensors in the plane to the expected range of spacing between temperature sensors in the intake end of a rack to determine whether the plane is an intake plane.

14. The computer program product of claim 13, further comprising computer usable program code for identifying the exhaust plane relative to the intake plane.

15. The computer program product of claim 11, further comprising computer usable program code for identifying if the intake end of a first computer equipment rack faces the exhaust end of a second computer equipment rack, and generating an alert in response.

16. The computer program product of claim 11, wherein the step of computing the layout of the computer equipment racks includes determining the footprint of each computer equipment rack.

17. The computer program product of claim 11, wherein the computer usable program code for computing the layout of the computer equipment racks includes computer usable program code for determining the spacing between the computer equipment racks.

18. The computer program product of claim 11, further comprising:
    computer usable program code for selecting a target cold aisle space for each computer equipment rack;
    computer usable program code for identifying a pair of adjacent racks having a shared cold aisle; and
    computer usable program code for identifying and assessing a point penalty if the target cold aisle spaces overlap or have an intervening gap.

19. The computer program product of claim 11, further comprising:
- computer usable program code for selectively repositioning one or more of the rack-mount computer components with respect to the computer equipment racks; and
- computer usable program code for repeating the step of obtaining the positions of the temperature sensors after repositioning the rack-mount computer components.

20. The computer program product of claim 11, further comprising:
- computer usable program code for comparing actual values of layout parameters to target values of the layout parameters; and
- computer usable program code for scoring the layout according to the comparison between the actual values and target values of the layout parameters.

* * * * *